United States Patent [19]
Kern et al.

[11] Patent Number: 5,858,058
[45] Date of Patent: Jan. 12, 1999

[54] PROCESS AND PLANT FOR AVOIDING METAL DUSTING IN THE DIRECT REDUCTION OF IRON-OXIDE-CONTAINING MATERIALS

[75] Inventors: Gerald Kern, Vienna; Werner Leopold Kepplinger, Leonding; Johannes Schenk, Linz, all of Austria; Roy Hubert Whipp, Jr., Windermere, Fla.

[73] Assignees: Voest-Alpine Industrieanlagenbau GmbH, Austria; Brifer International Ltd., Barbados

[21] Appl. No.: 765,331
[22] PCT Filed: Jun. 20, 1995
[86] PCT No.: PCT/AT95/00123
§ 371 Date: Jan. 15, 1997
§ 102(e) Date: Jan. 15, 1997
[87] PCT Pub. No.: WO96/00304
PCT Pub. Date: Jan. 4, 1996

[30] Foreign Application Priority Data

Jun. 23, 1994 [AT] Austria ................. A 1250/94

[51] Int. Cl.⁶ .................................................. C21B 13/00
[52] U.S. Cl. .................. 75/505; 75/450; 266/78; 266/156; 266/172
[58] Field of Search ............. 75/450, 505; 266/172, 266/156, 78

[56] References Cited

U.S. PATENT DOCUMENTS

| | | |
|---|---|---|
| 2,752,234 | 6/1956 | Shipley . |
| 3,936,296 | 2/1976 | Campbell .................................. 75/26 |
| 4,224,057 | 9/1980 | Martinez-Vera et al. . |
| 4,376,648 | 3/1983 | Ohtawa et al. ........................... 75/498 |
| 5,082,251 | 1/1992 | Whipp . |
| 5,213,611 | 5/1993 | Carranza-Almaguer .................. 75/444 |
| 5,382,277 | 1/1995 | Rose ....................................... 266/172 |
| 5,531,424 | 7/1996 | Whipp ..................................... 266/156 |

FOREIGN PATENT DOCUMENTS

| | | |
|---|---|---|
| 179752 | 4/1986 | European Pat. Off. . |
| 571358 | 11/1993 | European Pat. Off. . |
| 2103731 | 8/1972 | Germany . |
| 799551 | 8/1958 | United Kingdom . |

Primary Examiner—Melvyn Andrews
Attorney, Agent, or Firm—Ostrolenk, Faber, Gerb & Soffen, LLP

[57] ABSTRACT

A direct reduction process is disclosed for iron-oxide-containing materials. Synthesis gas is mixed with top gas produced during direct reduction of the iron-oxide-containing materials and is used as reduction gas for directly reducing iron-oxide-containing materials. In order to avoid or reduce metal dusting caused by an increased CO content of the reduction gas with a simple technique and equipment, the $CO/CO_2$ ratio of the reduction gas is set at a predetermined value from 1 to 3.

21 Claims, 1 Drawing Sheet

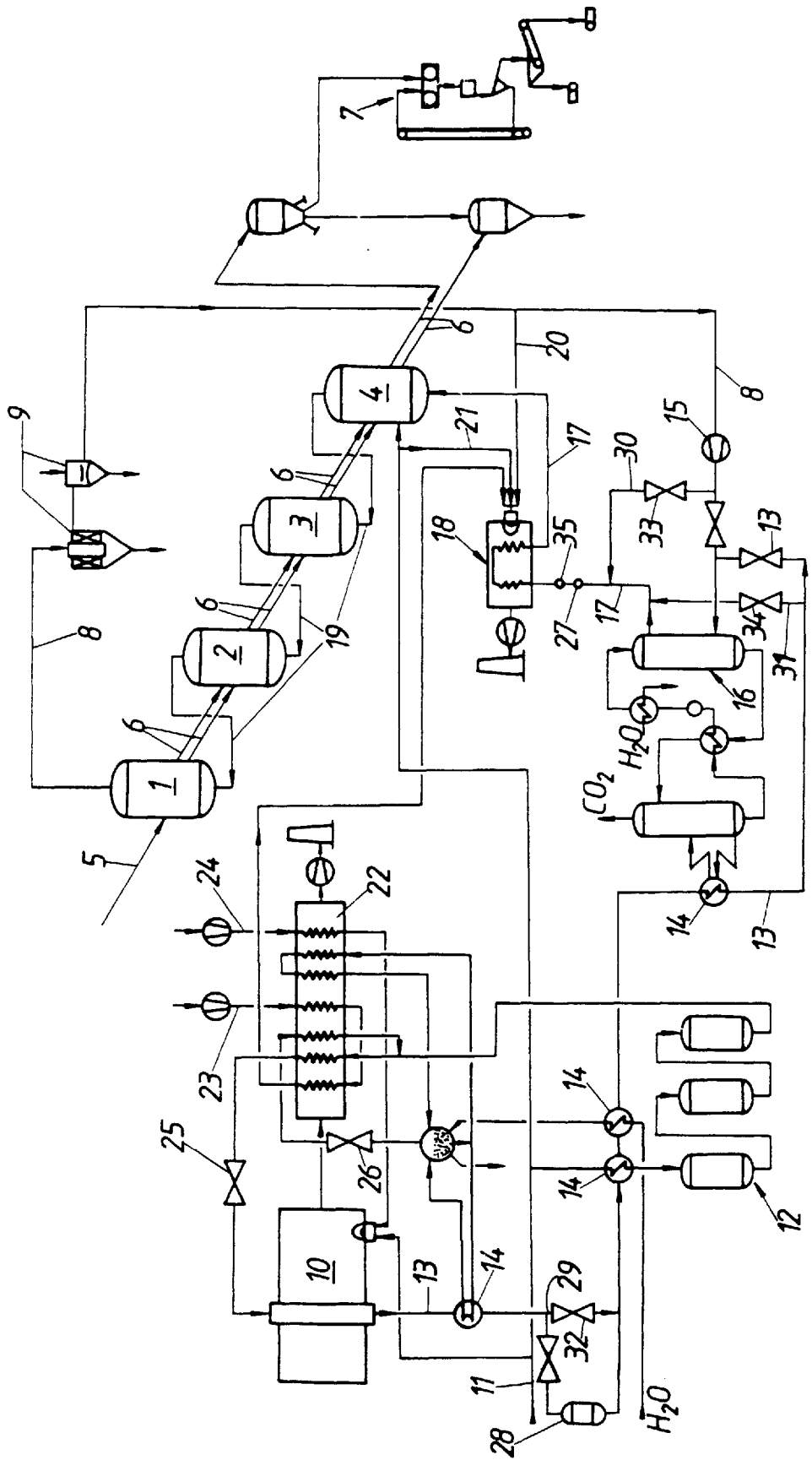

PROCESS AND PLANT FOR AVOIDING METAL DUSTING IN THE DIRECT REDUCTION OF IRON-OXIDE-CONTAINING MATERIALS

FIELD OF THE INVENTION

The invention relates to a process for avoiding metal dusting in the direct reduction of iron-oxide-containing material, wherein synthesis gas is mixed with top gas forming in the direct reduction of the iron-containing material and is used as a CO- and $H_2$-containing reducing gas for the direct reduction of the iron-oxide-containing material, as well as a plant for carrying out the process.

DESCRIPTION OF THE RELATED ART

A process of this type is known, for instance, from U.S. Pat. No. 2,752,234, U.S. Pat. No. 5,082,251 and EP-A - 0 571 358.

From EP-A - 0 571 358 it is known to carry out the reduction of fine ore not exclusively via the strongly endothermic reaction with $H_2$ according to $$Fe_2O_3 + 3H_2 = 2\,Fe + 3H_2O - \Delta H,$$

but additionally via the reaction with CO according to $$Fe_2O_3 + 3CO = 2\,Fe + 3CO_2O + \Delta H,$$

which is an exothermic reaction. Thereby, it is feasible to considerably lower the operational costs, in particular the energy costs, involved.

However, in metallic plant parts that get into contact with CO-containing reducing gas are subject to a high stress due to corrosion: The result, i.a., is metal decomposition, which is denoted as "metal dusting" in the technical literature. Metal dusting occurs to an increased extent at elevated temperatures, plant parts that get into contact with hot CO-containing reducing gas, thus, being particularly jeopardized. With a plant for carrying out the initially mentioned process, these are the reactors employed for direct reduction and the gas heater heating the reducing gas to reduction temperature.

To avoid or reduce metal dusting, it is internally known to provide for a content of sulfur within the reducing gas, which has been accomplished by blowing in $H_2S$ gas through tuyeres. Such an admixture of $H_2S$ gas is not only technologically complex, but also very expensive and, in addition, involves procedural difficulties, i.e., it is difficult to adjust the $H_2S$ content in the reducing gas uniformly to a predetermined value as a function of the chemical composition of the reducing gas.

SUMMARY OF THE INVENTION

The invention aims at avoiding these disadvantages and difficulties and has as its object to provide a process of the initially defined kind, and a plant for carrying out the process, by which the occurrence of metal dusting is minimized or prevented in a simple manner despite an elevated Co content of the reducing gas, in particular, in a procedurally and structurally simple and cost-saving manner, so that the service life of metallic plant parts will be considerably increased.

In a process of the initially described kind, this object is achieved in that the reducing gas is adjusted to a predetermined per se known $CO/CO_2$ ratio of between 1 and 3, namely by adjusting the operating characteristics of a reformer that serves for the production of synthesis gas from natural gas by reformation, by varying the vapor/natural-gas ratio during feeding of the reformer.

By adjusting a $CO/CO_2$ ratio of between 1 and 3 it is feasible to decisively lower the reaction activity of the CO contained in the reducing gas relative to metal, in particular steel, and hence the need for repair work of the direct reduction plant, without having to renounce elevated CO contents enabling the procedurally beneficial exothermic reaction with $Fe_2O_3$.

From DE-A 2 103 731, a process is known for directly reducing lumpy or agglomerated iron-ore-containing materials in a shaft furnace by hydrogen-containing reducing gases at elevated pressure, wherein reduction is effected employing hydrogen as the reducing gas containing impurities in an amount of maximally 5 Vol. % CO, 5 Vol. % $CO_2$, 5 Vol. % $CH_2$ and 2 Vol. % water vapor. Herein, the hydrogen-containing reducing gas, which contains roughly 90 Vol. % $H_2$, can contain 1.9 Vol. % $CO_2$ and 4.1 Vol. % CO. CO and $CO_2$ are here merely impurities.

According to a variant of the process according to the invention, the adjustment of the $CO/CO_2$ ratio is effected in that a partial volume of the reformed gas, which is produced from vapor and natural gas in a reformer and subsequently is fed to CO conversion to increase its $H_2$ content, is admixed to the top gas directly, i.e., without being subjected to CO conversion, the amount of the directly admixed reformed gas being variable.

Another preferred process variant comprises subjecting the reformed gas and optionally also the top gas to $CO_2$ scrubbing prior to being used as a reducing gas and that the adjustment of the $CO/CO_2$ ratio is effected in that at least a partial volume of the reformed gas is directly admixed to the reducing gas under avoidance of $CO_2$ scrubbing.

Furthermore, the reformed gas and optionally also the top gas suitably may be subjected to $CO_2$ scrubbing, the adjustment of the $CO/CO_2$ ratio being effected in that at least a partial volume of the top gas is directly admixed to the reducing gas under avoidance of $CO_2$ scrubbing.

According to another preferred process variant, the reformed gas and optionally also the top gas are subjected to $CO_2$ scrubbing prior to being used as a reducing gas, wherein the adjustment of the $CO/CO_2$ ratio is effected in that the degree of scrubbing of $CO_2$ scrubbing is varied with a view to retaining a portion of $CO_2$ in the scrubbed gas.

To further reduce metal dusting, it may be advantageous to additionally supply to the reducing gas, along with the top gas, at least a portion of the sulfur contained in the iron-oxide-containing material in the form of $H_2S$ incurring in heating or in direct reduction, wherein advantageously a $H_2S$ content ranging from 20 to 40 ppmV, preferably amounting to about 25 ppmV, is adjusted in the reducing gas by means of the top gas.

If the iron-oxide-containing material does not contain sufficient sulfur, a sulfurous material, such as iron pyrite, suitably is added.

Preferably, reformed natural gas is employed as the synthesis gas.

Suitably, a $CO/CO_2$ ratio of between 1.5 and 2.0 is adjusted.

A plant for carrying out the process, comprising at least one direct reduction reactor for reducing the iron-oxide-containing material, a reducing-gas supply duct leading to said direct reduction reactor and a top-gas discharge duct carrying off the direct reduction reactor the top gas forming in direct reduction, a reformer, a reformed-gas duct departing from the reformer and joining the top-gas discharge duct, the reducing gas formed of reformed gas and of top gas getting into the direct reduction reactor through the reducing-gas supply duct and both the reformed-gas duct and the top-gas discharge duct running into a $CO_2$ scrubber, and the reducing-gas supply duct leading from the $CO_2$ scrubber to the direct reduction reactor, is characterized in that the reformed-gas duct, by means of a bypass duct avoiding the $CO_2$ scrubber, is flow-connected with the reducing-gas supply duct. Advantageously, the top-gas discharge duct is flow-connected with the reducing-gas supply duct by means of a bypass duct avoiding the $CO_2$ scrubber.

Suitably, the bypass duct(s) is (are) equipped with a control valve capable of being activated via a $CO_2$ and, if desired, an $H_2S$ measuring means.

According to a preferred embodiment, the reformer is followed by a CO converter for the reformed gas, which may be bypassed by means of a bypass duct for a partial amount of the reformed gas.

In the following, the invention will be explained in more detail by way of the drawing illustrating a process diagram according to a preferred embodiment.

BRIEF DESCRIPTION OF THE DRAWING

The figure shows the plant according to the invention.

DETAILED DESCRIPTION OF THE INVENTION

This plant comprises four fluidized-bed reactors 1 to 4 consecutively connected in series, wherein iron-oxide-containing material, such as fine ore, through an ore supply duct 5 is supplied to the first fluidized-bed reactor 1, in which heating to reduction temperature (or prereduction) takes place, and subsequently is conducted from one fluidized-bed reactor to another fluidized-bed reactor via conveying ducts 6. The completely reduced material (sponge iron) is hot-briquetted in a briquetting arrangement 7. If required, the reduced iron is protected from reoxidation during briquetting by an inert gas system not illustrated All arabic numerals herein refer back to the figure.

In accordance with the invention, prior to introducing the fine ore into the first fluidized-bed reactor 1, it is subjected to ore preparation, such as drying and sieving, not illustrated in detail.

Reducing gas is conducted in counterflow to the ore flow from one fluidized-bed reactor 4 to another fluidized-bed reactor 3 to 1 and is carried off the last fluidized-bed reactor 1, viewed in the gas flow direction, as a top gas through a top-gas discharge duct 8 and is cooled and scrubbed in a wet scrubber 9.

The production of reducing gas is effected by reforming in a reformer 10 natural gas fed through a duct 11 and desulfurized in a desulfurization plant 12. The gas leaving the reformer 10 and formed of natural gas and vapor essentially consists of $H_2$, CO, $CH_4$, $H_2O$ and $CO_2$. This reformed natural gas is supplied through a reformed-gas duct 13 to several heat exchangers 14, in which it is cooled to 80° to 150° C., water thus being condensed out of the gas.

The reformed-gas duct 13 runs into the top-gas discharge duct 8 after the top gas has been compressed by means of a compressor 15. The mixed gas thus forming is passed through a $CO_2$ scrubber 16 and is freed from $CO_2$ and also from $H_2S$. It is then available as a reducing gas. This reducing gas, via a reducing-gas supply duct 17, is heated to a reducing-gas temperature of about 800° C. in a gas heater 18 arranged to follow the $CO_2$ scrubber 16 and is fed to the first fluidized-bed reactor 4, viewed in the gas flow direction, where it reacts with the fine ores to produce directly reduced iron. The fluidized-bed reactors 4 to 1 are arranged in series; the reducing gas gets from one fluidized-bed reactor to another fluidized-bed reactor through connection ducts 19.

A portion of the top gas is sluiced out of the gas circulatory system 8, 17, 19 in order to avoid enrichment of inert gases, such as $N_2$. The sluiced-out top gas is fed through a branch duct 20 to the gas heater 18 for heating the reducing gas and is burnt there. Possible shortages of energy are supplemented by natural gas supplied through a feed duct 21.

The sensible heat of the reformed natural gas emerging from the reformer 10 as well as of the reformer smoke gases is utilized in a recuperator 22 to preheat the natural gas after passage through the desulfurization plant 12, to produce the vapor required for reformation and to preheat the combustion air supplied to the gas heater 18 through duct 23 as well as, if desired, also the reducing gas. The combustion air supplied to the reformer 10 through duct 24 is preheated as well.

To adjust a predetermined $CO/CO_2$ ratio, which is to range between 1 and 3, preferably between 1.5 and 2.0 in order to avoid or substantially reduce metal dusting, the invention, according to a first variant, provides to vary the vapor/natural-gas ratio of the feeding to the reformer 10, the vapor/natural-gas ratio preferably being adjusted to a value ranging between 3 and 4.5, in particular, to a value of 3.5. The adjustment valves or control valves serving this purpose are denoted by 25 and 26 and are adjustable or controllable, respectively, from a measuring station 27 measuring the $CO/CO_2$ ratio of the reducing gas.

As is apparent from the drawing, the reformed gas, at least at a partial volume, is supplied to a CO converter 28 to increase its $H_2$ content before being supplied to $CO_2$ scrubbing at 16. The remaining partial volume of the reformed gas is directly admixed to the top gas by bypassing the CO converter 28 via a bypass duct 29. Thereby, it is feasible to adjust the CO content to a desired value such that the desired $CO/CO_2$ ratio may be adjusted also by this procedural measure to avoid metal dusting.

Furthermore, the adjustment of a predetermined $CO/CO_2$ ratio may be effected by injecting a partial volume of the top gas directly into the reducing-gas supply duct 17 through a bypass duct 30 avoiding the $CO_2$ scrubber 16. Moreover, a partial volume of the reformed gas also may be directly fed to the reducing-gas supply duct 17 through a bypass duct 31 bypassing the $CO_2$ scrubber 16, which bypass duct 31 in that case departs from the reformed-gas duct 13.

All of the bypass ducts 29, 30, 31 are equipped with adjustment or control valves 32, 33, 34, which are adjusted or controlled on grounds of a measurement of the $CO/CO_2$ ratio of the reducing gas taken by means of the measuring station 27.

The desired $CO/CO_2$ ratio in the reducing gas also may be adjusted by passing all of the top gas and all of the reformed gas through the $CO_2$ scrubber 16, yet adjusting the latter to a wash-out level at which a portion of the $CO_2$ (and hence also a portion of the $H_2S$) will remain in the gas emerging from the $CO_2$ scrubber 16. This has the advantage that no auxiliary means, such as bypass ducts 29, 30, 31 including valves 32, 33, 34, need be provided, yet requires the total gas amount, i.e., all of the top gas and all of the reformed gas, to be passed through the $CO_2$ scrubber 16, the latter, thus, having to be dimensioned for such an amount.

The top gas leaving the fluidized-bed reactor 1 has an $H_2S$ content ranging between 40 and 140 ppmV—depending on the sulfur content of the ore. The $H_2S$ gas forms during heating of the fine ore to reduction temperature or during the prereduction of the fine ore, respectively.

Since an elevated $H_2S$ content in the reducing gas also reduces the development of metal dusting, it is particularly advantageous if $H_2S$ no longer is completely washed out of the top gas by means of the $CO_2$ scrubber, but if it is taken care that the percentage of $H_2S$ desired for the reducing gas be fed to the reducing gas from the top gas. In the instant case, this can be realized by means of bypass duct 30 bypassing the $CO_2$ scrubber 16, which bypass duct departs from the top-gas discharge duct 8 via the adjustment or control valve 33 and runs into the reducing-gas supply duct 17. The control valve 33 is adjustable in a manner that an $H_2S$ content ranging from 20 to 40 ppmV, preferably amounting to about 25 ppmV, is present in the reducing gas. In that case, the control valve preferably is activated via an $H_2S$ measuring means 35.

The measures described above for adjusting the desired $CO/CO_2$ ratio in the reducing gas may be taken individually or also several of them or all in common in a manner that the most favorable process variant may be chosen for the respective operation conditions and as a function of the composition of the ore, etc.

The adjustment of the $CO/CO_2$ ratio to about 1.7 and the adjustment of the $H_2S$ content to 25 ppmV is going to be explained by way of the following example:

100 t/h of dried fine ore are charged into a plant for the direct reduction of fine ore configured in accordance with the drawing and designed for a production of 70 t/h of sponge iron. The fine ore has the following analysis:

| | |
|---|---|
| Hematite | 94.2% |
| Gangue | 2.2% |
| Sulfur | 0.02% |

From the top gas forming in the direct reduction, 78,000 $Nm^3/h$ are mixed with 48,000 $Nm^3/h$ of reformed cold natural gas and passed through the $CO_2$ scrubber 16, in which the mixed gas is freed from $CO_2$ and the major portion of sulfur.

The reformed natural gas and the top gas have the chemical compositions indicated in the Table below.

| | Reformed Natural Gas | Top gas |
|---|---|---|
| $CH_4$ | 2.80 | 30.60 |
| CO | 4.80 | 5.80 |
| $CO_2$ | 14.50 | 5.30 |
| $H_2$ | 64.40 | 53.00 |
| $H_2O$ | 13.50 | 0.70 |
| $N_2$ | 0.0 | 4.60 |
| $H_2S$ | 0.0 | 60.0 ppmV |

The gas mixture emerging from the $CO_2$ scrubber 16 has the following composition:

| | |
|---|---|
| $CH_4$ | 22.80 |

-continued

| | |
|---|---|
| CO | 6.15 |
| $CO_2$ | 0.80 |
| $H_2$ | 64.90 |
| $H_2O$ | 2.10 |
| $N_2$ | 3.25 |
| $H_2S$ | 2 ppmV |

This gas mixture is mixed with 78,000 $Nm^3/h$ of top gas that has not been passed through the $CO_2$ scrubber 16, but has been injected into the reducing-gas supply duct 17 through bypass duct 30. Such mixing produces the reducing gas fed to the gas heater 18 and subsequently to the fluidized-bed reactors 1 to 4 and having the following chemical composition:

| Reducing Gas | |
|---|---|
| $CH_4$ | 24.50 |
| CO | 6.0 |
| $CO_2$ | 3.6 |
| $H_2$ | 60.90 |
| $H_2O$ | 1.5 |
| $N_2$ | 3.5 |
| $H_2S$ | 25 ppmV |

The degree of metallization of the sponge iron is 92%.

The invention is not limited to the abovedescribed example, but is applicable also to other direct reduction processes, for instance, such in which the fluidized-bed reactors 1 to 4 are replaced with shaft furnaces for lumpy ore. The reformed natural gas also may be replaced with other reducing gases primarily containing CO and $H_2$, such as LD offgas EAF offgas blast furnace gas from blast furnace plants blast furnace gas from Corex plants coal gas Corex gas from Corex gasifier chemical gases.

We claim:

1. A process for avoiding metal dusting while performing a direct reduction of iron-oxide-containing material comprising:

(a) producing top gas in the direct reduction of the iron-oxide-containing material and reformed natural gas from vapor and natural gas in a reformer;

(b) mixing the reformed natural gas with the top gas, wherein resulting mixture is a reducing gas that contains CO, $CO_2$ and $H_2$ and is used for the direct reduction of the iron-oxide-containing material; and (c) adjusting the $CO/CO_2$ ratio of the reducing gas to between 1/1 and 3/1, by varying the ratio of vapor/natural-gas in the reformer.

2. A process according to claim 1, wherein the vapor/natural-gas ratio is adjusted within a range from 3/1 to 4.5/1.

3. A process according to claim 1, wherein the vapor/natural-gas ratio is to a value of about 3.5/1.

4. A process for avoiding metal dusting while performing a direct reduction of iron-oxide-containing material comprising:

(a) producing top gas in the direct reduction of the iron-oxide-containing material;

(b) mixing synthesis gas with the top gas, wherein resulting mixture is a reducing gas that contains CO, $CO_2$ and $H_2$ and is used for the direct reduction of the iron-oxide-containing material; and (c) adjusting the $CO/CO_2$ ratio of the reducing gas to between 1/1 and 3/1, by subjecting at least a partial volume of the synthesis gas to CO conversion prior to the mixing of step (b).

5. A process for avoiding metal dusting while performing a direct reduction of iron-oxide-containing material comprising:

(a) producing top gas in the direct reduction of the iron-oxide-containing material;

(b) mixing synthesis gas with the top gas, wherein resulting mixture is a reducing gas that contains CO, $CO_2$ and $H_2$ and is used for the direct reduction of the iron-oxide-containing material; and (c) adjusting the $CO/CO_2$ ratio of the reducing gas to between 1/1 and 3/1, by subjecting a partial volume of the synthesis gas to $CO_2$ scrubbing prior to the mixing of step (b).

6. A process according to claim 5, wherein the top gas is subjected to $CO_2$ scrubbing prior to the mixing of step (b).

7. A process for avoiding metal dusting while performing a direct reduction of iron-oxide-containing material comprising:

(a) producing top gas in the direct reduction of the iron-oxide-containing material;

(b) mixing synthesis gas with the top gas, wherein resulting mixture is a reducing gas that contains CO, $CO_2$ and $H_2$ and is used for the direct reduction of the iron-oxide-containing material; and (c) adjusting the reducing gas to a $CO/CO_2$ ratio of between 1/1 and 3/1 by subjecting the synthesis gas to $CO_2$ scrubbing prior to the mixing of step (b).

8. A process according to claim 7, wherein a partial volume of the top gas is subjected to $CO_2$ scrubbing prior to the mixing of step (b).

9. A process for avoiding metal dusting while performing a direct reduction of iron-oxide-containing material comprising:

(a) producing top gas in the direct reduction of the iron-oxide-containing material;

(b) mixing synthesis gas with the top gas, wherein resulting mixture is a reducing gas that contains CO, $CO_2$ and $H_2$ and is used for the direct reduction of the iron-oxide-containing material; and (c) adjusting the reducing gas to a $CO/CO_2$ ratio of between 1/1 and 3/1 by subjecting a partial volume of the synthesis gas to $CO_2$ scrubbing prior to the mixing of step (b), wherein the degree of $CO_2$ scrubbing is such that a varied portion of $CO_2$ is retained in the scrubbed gas.

10. A process according to claim 9, wherein a partial volume of the top gas is subjected to $CO_2$ scrubbing prior to the mixing of step (b).

11. A process for avoiding metal dusting while performing a direct reduction of sulfur- and iron-oxide-containing material comprising:

(a) producing top gas in the direct reduction of the iron-oxide-containing material;

(b) mixing synthesis gas with the top gas, wherein resulting mixture is a reducing gas that contains CO, $CO_2$ and $H_2$ and is used for the direct reduction of the iron-oxide-containing material; and (c) adjusting the reducing gas to a $CO/CO_2$ ratio of between 1/1 and 3/1 by supplying at least a portion of the sulfur contained in the iron-oxide-containing material to the reducing gas along with the top gas in the form of $H_2S$ as a result of heating or direct reduction.

12. A process according to claim 11, wherein a $H_2S$ content ranging from 20 to 40 ppmV is adjusted in the reducing gas by means of the top gas.

13. A process according to claim 12, wherein the $H_2S$ content is about 25 ppmV.

14. A process according to claim 1, wherein a sulfurous material is added to the iron-oxide-containing material.

15. A process according to claim 4, wherein the synthesis gas is at least one gas selected from the group consisting of: reformed natural gas, LD offgas, EAF offgas, blast furnace gas from blast furnace plants, coal gas, gas from gasifiers and chemical gases.

16. A process according to claim 1, wherein the $CO/CO_2$ ratio is adjusted to between 1.5/1 to 2.0/1.

17. A plant for carrying out a process for avoiding meal dusting in performing direct reduction of iron-oxide-containing material, comprising at least one direct reduction reactor for reducing the iron-oxide-containing material, a reducing-gas supply duct leading to said direct reduction reactor and a top-gas discharge duct carrying off the direct reduction reactor the top gas forming in direct reduction, a reformer, a reformed-gas duct departing from the reformer and joining the top-gas discharge duct, the reducing gas formed of reformed gas and of top gas getting into the direct reduction reactor through the reducing-gas supply duct and both the reformed-gas duct and the top-gas discharge duct running into a $CO_2$ scrubber, and the reducing-gas supply duct leading from the $CO_2$ scrubber to the direct reduction reactor, wherein the reformed-gas duct, by means of a reformed-gas bypass duct to avoid $CO_2$ scrubber, is flow-connected with the reducing-gas supply duct.

18. A plant according to claim 17, wherein the top-gas discharge duct is flow-connected with the reducing-gas supply duct by means of a reducing-gas bypass duct to avoid the $CO_2$ scrubber.

19. A plant according to claim 18, wherein the bypass duct are equipped with a control valve capable of being activated via a $CO_2$ measuring means.

20. A plant according to claim 19, wherein the bypass ducts are equipped with an $H_2S$ measuring means.

21. A plant according to claim 17, wherein the reformer is followed by a Co converter for the reformed gas capable of being bypassed by means of a bypass duct for a partial amount of the reformed gas.

* * * * *